United States Patent
Toyoda et al.

(10) Patent No.: US 10,457,165 B2
(45) Date of Patent: Oct. 29, 2019

(54) PROVIDING A NOTIFICATION TO AN OCCUPANT USING A VEHICLE SEAT

(71) Applicant: Toyota Motor Engineering & Manufacturing North America, Inc., Erlanger, KY (US)

(72) Inventors: Heishiro Toyoda, Ann Arbor, MI (US); John K. Lenneman, Okemos, MI (US); Joshua E. Domeyer, Ann Arbor, MI (US)

(73) Assignee: Toyota Motor Engineering & Manufacturing North America Inc., Plano, TX (US)

( * ) Notice: Subject to any disclaimer, the term of this patent is extended or adjusted under 35 U.S.C. 154(b) by 300 days.

(21) Appl. No.: 15/443,711

(22) Filed: Feb. 27, 2017

(65) Prior Publication Data
US 2018/0244173 A1    Aug. 30, 2018

(51) Int. Cl.
*B60W 30/00* (2006.01)
*B60N 2/02* (2006.01)
*B60N 2/90* (2018.01)

(52) U.S. Cl.
CPC ......... *B60N 2/0232* (2013.01); *B60N 2/0276* (2013.01); *B60W 30/00* (2013.01); *B60N 2002/0268* (2013.01); *B60N 2002/981* (2018.02)

(58) Field of Classification Search
CPC .............. B60N 2/02; B60N 2002/981; B60N 2002/0268; B60W 30/00; B60Q 9/00; G06K 9/00845
USPC ............ 701/49; 180/282; 318/445; 280/734, 280/735
See application file for complete search history.

(56) References Cited

U.S. PATENT DOCUMENTS

| | | | | |
|---|---|---|---|---|
| 3,910,135 A | * | 10/1975 | Phillips | B60K 26/00 74/511 R |
| 6,677,720 B2 | * | 1/2004 | Fraser | B60N 2/0244 297/284.1 |
| 6,744,370 B1 | | 6/2004 | Sleichter, III et al. | |
| 7,354,106 B2 | * | 4/2008 | Dennis | B60N 2/4242 297/216.1 |

(Continued)

FOREIGN PATENT DOCUMENTS

JP   2000020900 A   1/2000

OTHER PUBLICATIONS

Microwave interferometer radar-based vital sign detection for driver monitoring syst;Gabor Vinci ;et al.; 2015 IEEE MTT-S International Conference on Microwaves for Intelligent Mobility (ICMIM); pp. 1-4; IEEE Conferences. (Year: 2015).*

(Continued)

*Primary Examiner* — Cuong H Nguyen
(74) *Attorney, Agent, or Firm* — Christopher G. Darrow; Darrow Mustafa PC

(57) ABSTRACT

Systems and methods for providing a notification of an upcoming acceleration to an occupant of a vehicle are disclosed herein. The vehicle includes a seat that is movable in one or more directions. The vehicle can identify a direction and magnitude of acceleration corresponding to an upcoming maneuver. The vehicle can also track one or more states of the occupant. The vehicle can generate control signals to move the seat based on the state of the occupant and the direction and magnitude of the acceleration for the upcoming maneuver.

17 Claims, 4 Drawing Sheets

(56) References Cited

U.S. PATENT DOCUMENTS

| | | | |
|---|---|---|---|
| 7,689,361 B2* | 3/2010 | Hijikata | B60W 50/16 701/301 |
| 2002/0185985 A1* | 12/2002 | Fraser | B60N 2/0244 318/445 |
| 2003/0114973 A1* | 6/2003 | Takagi | B60R 21/0132 701/45 |
| 2006/0116807 A1* | 6/2006 | Hijikata | B60W 50/16 701/96 |
| 2008/0109140 A1* | 5/2008 | Hozumi | B60N 2/0244 701/49 |
| 2009/0072997 A1* | 3/2009 | Shrum, Jr. | G08G 1/127 340/905 |
| 2011/0012753 A1* | 1/2011 | Shrum, Jr. | G08G 1/127 340/902 |
| 2013/0342339 A1 | 12/2013 | Kiefer et al. | |
| 2016/0311323 A1* | 10/2016 | Lee | B60K 37/06 |
| 2016/0318442 A1* | 11/2016 | James | B60Q 9/00 |
| 2017/0140232 A1* | 5/2017 | Banno | G06T 7/70 |
| 2017/0157521 A1* | 6/2017 | Comploi | A63G 25/00 |
| 2017/0161575 A1* | 6/2017 | Banno | B60K 28/06 |
| 2017/0162168 A1* | 6/2017 | Lopez | G09G 5/006 |
| 2018/0244173 A1* | 8/2018 | Toyoda | B60N 2/02 |
| 2019/0031060 A1* | 1/2019 | Rappl | B60N 2/5671 |
| 2019/0077419 A1* | 3/2019 | Samma | B60N 2/90 |

OTHER PUBLICATIONS

All aboard the robotic road train; Erik Coelingh ; Stefan Solyom; IEEE Spectrum; vol. 49 , Issue: 11; pp. 34-39; IEEE Journals & Magazines. (Year: 2012).*

* cited by examiner

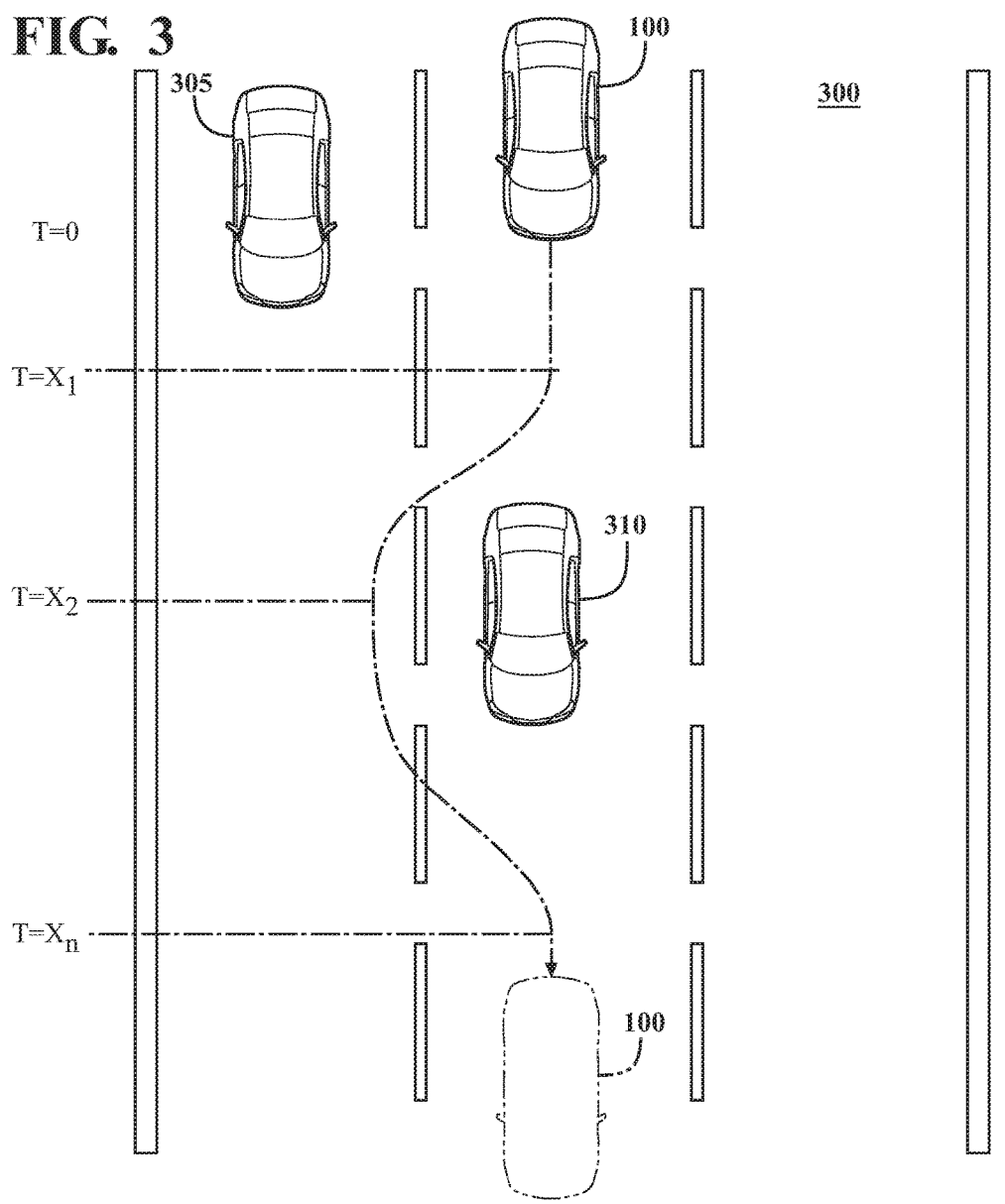
FIG. 3
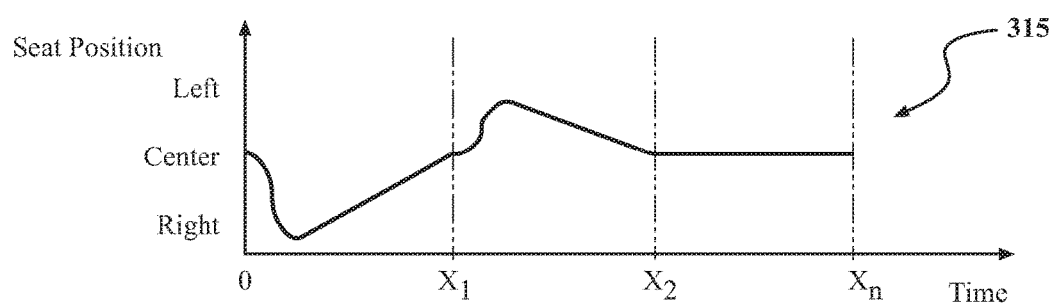

PROVIDING A NOTIFICATION TO AN OCCUPANT USING A VEHICLE SEAT

TECHNICAL FIELD

The subject matter described herein relates in general to providing notifications and, more particularly, to using movement of vehicle seats to provide notifications to passengers.

BACKGROUND

Vehicles are becoming increasingly automated. As a result, occupants of the vehicle may not be as attentive to the roadway. In some instances, occupants may be able to pay attention to other things, such as cell phones, computers, etc. Additionally, in some instances, occupants may be able to sleep in an automated vehicle.

SUMMARY

Systems and methods for providing a notification to an occupant using a vehicle seat are disclosed herein. Generally, a seat is moved according to an upcoming acceleration for the vehicle. As a result, the occupant of the seat experiences movement prior to the upcoming acceleration, and is therefore notified of the upcoming acceleration.

One example includes a system for providing a notification of an upcoming acceleration to an occupant of a vehicle. The system can include a processor. The system can also include a memory operatively connected to the processor. The memory can store an acceleration identification module including instructions that, when executed by the processor, cause the processor to identify a direction and magnitude of acceleration corresponding to a maneuver associated with the vehicle. The memory can also store a state tracking module including instructions that, when executed by the processor, cause the processor to track a state of the occupant. The memory can also store a seat actuation module including instructions that, when executed by the processor, cause the processor to generate a signal that moves the seat (i) in a direction corresponding to the direction of acceleration and (ii) with an acceleration rate corresponding to the magnitude of acceleration for the maneuver and the state of the occupant.

Another example includes a system for providing a notification of an upcoming acceleration to an occupant of a vehicle. The system can include a processor. The system can also include a memory operatively connected to the processor. The memory can store an acceleration identification module including instructions that, when executed by the processor, cause the processor to identify a direction and magnitude of acceleration corresponding to an upcoming maneuver associated with the vehicle. The memory can also store a state tracking module including instructions that, when executed by the processor, cause the processor to track a gaze of the occupant. The memory can also store a seat actuation module including instructions that, when executed by the processor, cause the processor to generate, when the gaze of the occupant is determined not to be directed towards the roadway, a signal to move a seat from a first position (i) in a direction corresponding to the direction of acceleration, and (ii) with an acceleration rate corresponding to the magnitude of acceleration for the upcoming maneuver.

Another example includes a method of providing a notification of an upcoming acceleration to an occupant of a vehicle. The method can include identifying a direction of acceleration for a maneuver associated with the vehicle. The method can also include generating a signal to move a seat from a first position in a direction corresponding to the direction of acceleration for the maneuver prior to the vehicle executing the maneuver.

BRIEF DESCRIPTION OF THE DRAWINGS

FIG. 3 illustrates an example of an environment within which the vehicle of FIG. 1 may operate.

DETAILED DESCRIPTION

Systems and methods associated with providing a notification of an upcoming acceleration to an occupant of a vehicle. Since occupants will likely become less attentive as vehicles become increasingly automated, the occupants will not be anticipating sudden changes in acceleration. When the vehicle executes a maneuver that results in a sudden acceleration change, the occupant may become startled. This can result in an occupant losing confidence in their autonomous vehicle.

Therefore, in one example, the vehicle includes a seat configured to move in one or more directions. The vehicle can identify a direction and magnitude of acceleration corresponding to an upcoming maneuver. Also, the vehicle can track a state of the occupant. The vehicle can generate signal(s) to move the seat based on the state of the occupant and the direction and magnitude of the acceleration for the upcoming maneuver. As a result, the systems and methods disclosed herein can alert an occupant of an upcoming acceleration prior to the acceleration actually occurring. Such systems and methods can also increase the confidence of the occupant in their vehicle. Additionally, by providing the notification by moving the seat, the occupant experiences a change in their equilibrium (via the acceleration experienced by the occupant), and may increase the likelihood that the attention of the occupant is drawn towards the roadway.

Figure 1:
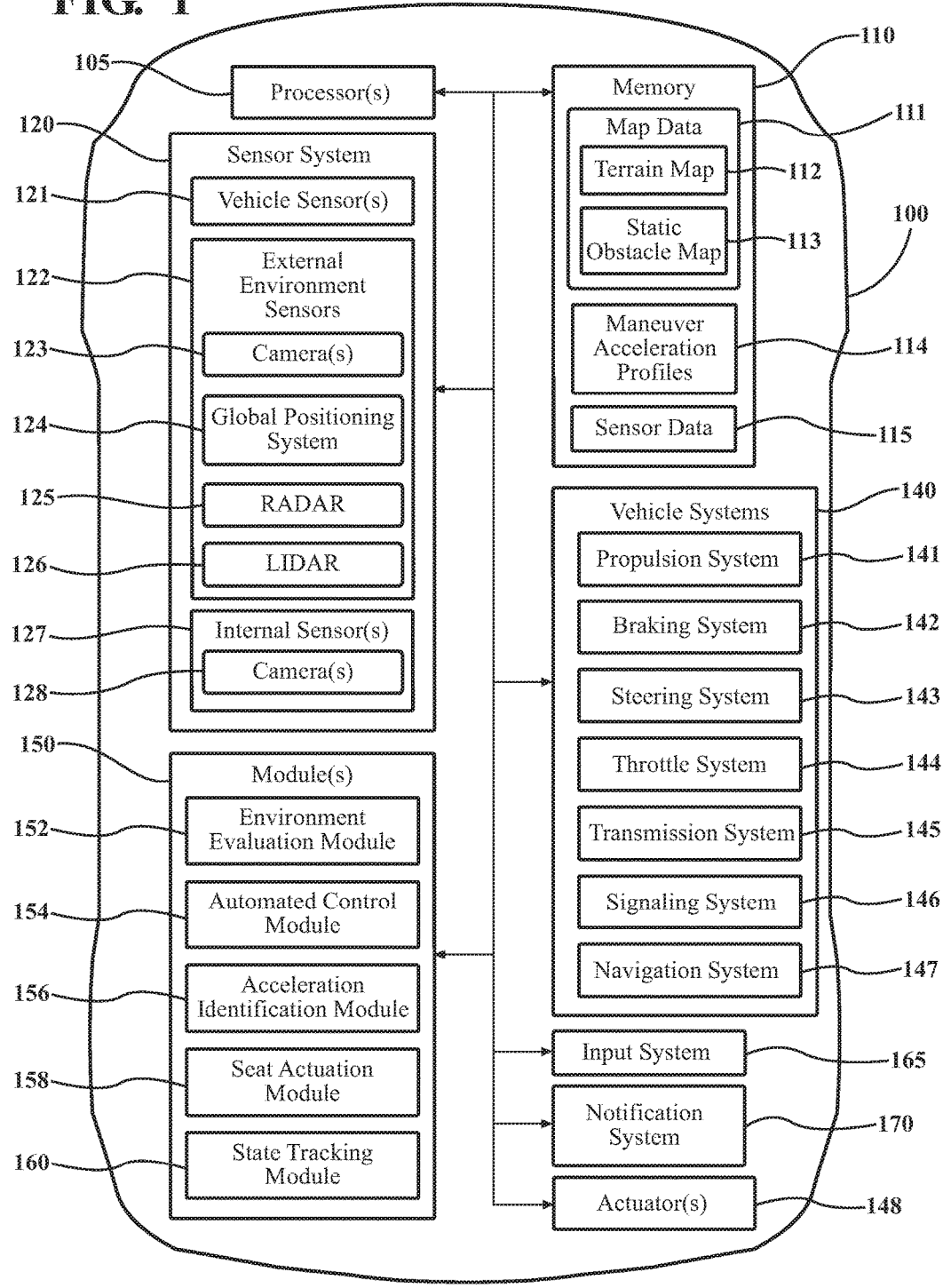
FIG. 1 is a schematic view of a vehicle.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that examples are not limited to automobiles. In some implementations, the vehicle 100 may be any other form of motorized transport that, for example, includes a seat or other passenger support mechanism and thus benefits from the conveyance of notifications using the seat/support mechanism as discussed herein.

The vehicle 100 includes various elements. It will be understood that, in various examples, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Also, while the various elements are shown as being located within the vehicle 100 in FIG. 1, it should be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided following the discussion of FIGS. 1-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the examples described herein. Those of skill in the art, however, will understand that the examples described herein may be practiced using various combinations of these elements.

The vehicle 100 can include one or more processor(s) 105. The processor(s) 105 are configured to implement or perform various functions described herein. The vehicle 100 can also include memory 110 for storing one or more types of data. The memory 110 can be accessible by the processor(s) 105 and/or other components of the vehicle 100, including those shown in FIG. 1.

The vehicle 100 can include a sensor system 120. The sensor system 120 can include one or more sensors. The one or more sensors can be configured to detect, and/or sense in real-time. The sensor system 120 and/or the one or more sensors can be operatively connected to the processor(s) 105, the memory 110, and/or another element of the vehicle 100 (including any of the elements shown in FIG. 1). The sensor system 120 can include, for example, vehicle sensors 121, external environment sensors 122, internal sensors 127, etc. As will be understood below, the sensor system 120 can be used by the processor(s) 105 to perform various functions.

In one or more arrangements, the memory 110 can store one or more modules 150. Modules can be or include computer-readable instructions that, when executed by the processor 105, cause the processor 105 to perform the various functions disclosed herein. While the modules will be described herein with reference to functions for purposes of brevity, it should be understood that the modules include instructions that cause the processor(s) 105 to perform the described functions. Further, while one or more modules 150 can be stored on memory 110, it should be noted the various modules can be stored on and/or be a component of the processor(s) 105, can be remotely stored and accessible by the processor(s), etc.

The vehicle 100 can include an environment evaluation module 152. The environment evaluation module 152 can detect one or more objects located in the external environment of the vehicle 100. In one or more arrangements, the sensor(s) of the sensor system 120 generates and/or captures data corresponding to the external environment, and the external environment evaluation module 152 receives the data generated and/or captured by sensor system 120. In this regard, the environment evaluation module 152 can receive data in the form of sensor data from one or more sensors in the sensor system 120. In one or more arrangements, the environment evaluation module 152 can prompt the sensor system 120 to acquire sensor data. In other arrangements, the environment evaluation module 152 can acquire the data as it is captured and/or generated by the sensor system 120. In other arrangements, the environment evaluation module 152 can acquire the data in intervals. In one or more arrangements, the data received from the one or more sensors in the sensor system 120 may indicate the presence of one or more objects being located in the external environment of the vehicle 100.

The environment evaluation module 152 can determine relative positional data for each of the one or more objects located in the external environment of the vehicle 100. The relative positional data can include, for example, the location, speed, acceleration, etc. of each of the objects relative to the vehicle 100. In one or more arrangements, the environment evaluation module 152 detects and/or tracks the relative positional data for each of the objects by using the sensor data received from the sensor system 120 over time. In one or more arrangements, the environment evaluation module 152 can receive relative positional data from the one or more objects using, for example, a communications system (e.g., V2V communication system). The relative positional data can also include changes in the location, speed, acceleration, etc. relative to the vehicle 100 over time.

The environment evaluation module 152 can include instructions that cause the processor(s) 105 to construct a local map of the external environment of the vehicle 100. The local map can include one or more objects detected in the external environment and their relative positional data (e.g., location, velocity, acceleration, etc.) with respect to the vehicle 100. In one or more arrangements, the environment evaluation module 152 can include instructions to store the relative positional data and/or local map on, for example, memory 110. In these arrangements, the relative positional data and/or local map stored on memory 110 can be accessible by other components and/or modules of the vehicle 100.

The vehicle 100 can include an automated control module 154. As will be discussed in greater detail below, the automated control module 154 can include instructions that cause the processor(s) 105 to determine a deviation from the current path of travel of the vehicle 100 (e.g., a modified path of travel) for which an occupant of the vehicle 100 may be notified. The current path of travel can be a path where the vehicle 100 maintains its current heading with minimal to no acceleration. Therefore, the modified path of travel can include one or more maneuvers needed to follow the modified path of travel, any one of which resulting in a change in acceleration. In one or more arrangements, the current path of travel can be a path that is being followed by the vehicle 100. Where the path of travel is being followed by the vehicle 100, the vehicle 100 may be operating in an autonomous or semi-autonomous mode.

In one or more examples, the deviation from the current path of travel may be a result of one or more objects in the external environment of the vehicle 100. In one or more examples, the deviation from the current path of travel may be a result of changes to the roadway (e.g., road topology, number of lanes, speed limit, etc.). In either case, the deviation from the current path of travel may include one or more maneuvers (e.g., brake, speed up, turn left or right, left or right lane changes, sway left or right, etc.). Any one of these maneuver(s) can result in an occupant of the vehicle 100 experiencing an acceleration.

As will be discussed in greater detail below, the automated control module 154 can generate one or more control signals that cause the vehicle 100 to execute the one or more maneuvers. In causing the vehicle 100 to execute the one or more maneuvers, changes in acceleration may be experienced by one or more occupants of the vehicle 100. If the one or more occupants of the vehicle 100 are not paying attention to the roadway, the one or more occupants may be startled, as they did not anticipate any changes in acceleration.

The vehicle 100 can include an acceleration identification module 156. The acceleration identification module 156 can include instructions to determine one or more vehicle accelerations resulting from executing each of the one or more maneuvers. In one or more arrangements, each maneuver may include a direction and a magnitude of acceleration. The directions described herein, such as fore, aft, left, and right are in reference to a longitudinal forward direction of the vehicle 100 (see FIG. 2 for reference). Additionally, "Magnitude," as used herein, includes an amount of acceleration, and can include both positive and negative acceleration (e.g., deceleration).

As one example, a braking maneuver may have an "aft" direction, and a magnitude that changes with how hard the automated control module 154 determines the vehicle 100 needs to brake. As another example, a lateral maneuver (e.g., left/right turns, left/right lane changes, sway left/right, etc.) may have a left or right direction, and a magnitude that changes with how hard the automated control module 154 determines that the vehicle 100 needs to sway and/or turn. As shown in both examples, any given maneuver includes a direction and a magnitude.

The acceleration identification module 156 can include instructions to identify which maneuvers the vehicle 100 will execute to follow the modified path of travel. In one or more arrangements, the automated control module 154 determines one or more upcoming maneuvers to follow, and the acceleration identification module 156 identifies the maneuvers determined via the automated control module 154. In some arrangements, the acceleration identification module 156 can identify the one or more maneuvers prior to the vehicle 100 (via instructions from the automated control module 154) executing any of the one or more maneuvers.

The acceleration identification module 156 can include instructions to determine a direction and magnitude of acceleration for each of the one or more maneuvers that the vehicle 100 will execute. Where the vehicle 100 will execute two or more maneuvers (e.g., a series of maneuvers), the acceleration identification module 156 can determine a first direction and magnitude of acceleration for the first maneuver, a second direction and magnitude of acceleration for the second maneuver, etc.

In one or more arrangements, the vehicle 100 includes a plurality of maneuvers stored on memory 110. Each of the maneuvers can include an acceleration profile. In this regard, the memory 110 can include maneuver acceleration profiles 114 associated with any maneuvers that the vehicle 100 may execute. The acceleration identification module 156 can identify which maneuvers the vehicle 100 will execute, and access the memory 110 to retrieve the corresponding maneuver acceleration profiles 114. In some examples, a maneuver includes a plurality of accelerations that change over time. For example, during a lane change maneuver, the vehicle 100 will accelerate first in the direction of the lane change and, upon being located within the target lane, the vehicle will accelerate opposite the direction of the lane change. In these examples where a maneuver includes a plurality of accelerations, the acceleration identification module 156 can identify at least one of the plurality of accelerations for the maneuver.

In one or more arrangements, the acceleration identification module 156 compares the magnitude of acceleration for the upcoming maneuver(s) with an acceleration threshold. The acceleration threshold can be, for example, an acceleration that is perceptible to humans, or other nominal acceleration. In these arrangements, the acceleration identification module 156 identifies the accelerations with a magnitude of acceleration greater than (or equal to) the acceleration threshold.

Figure 2:
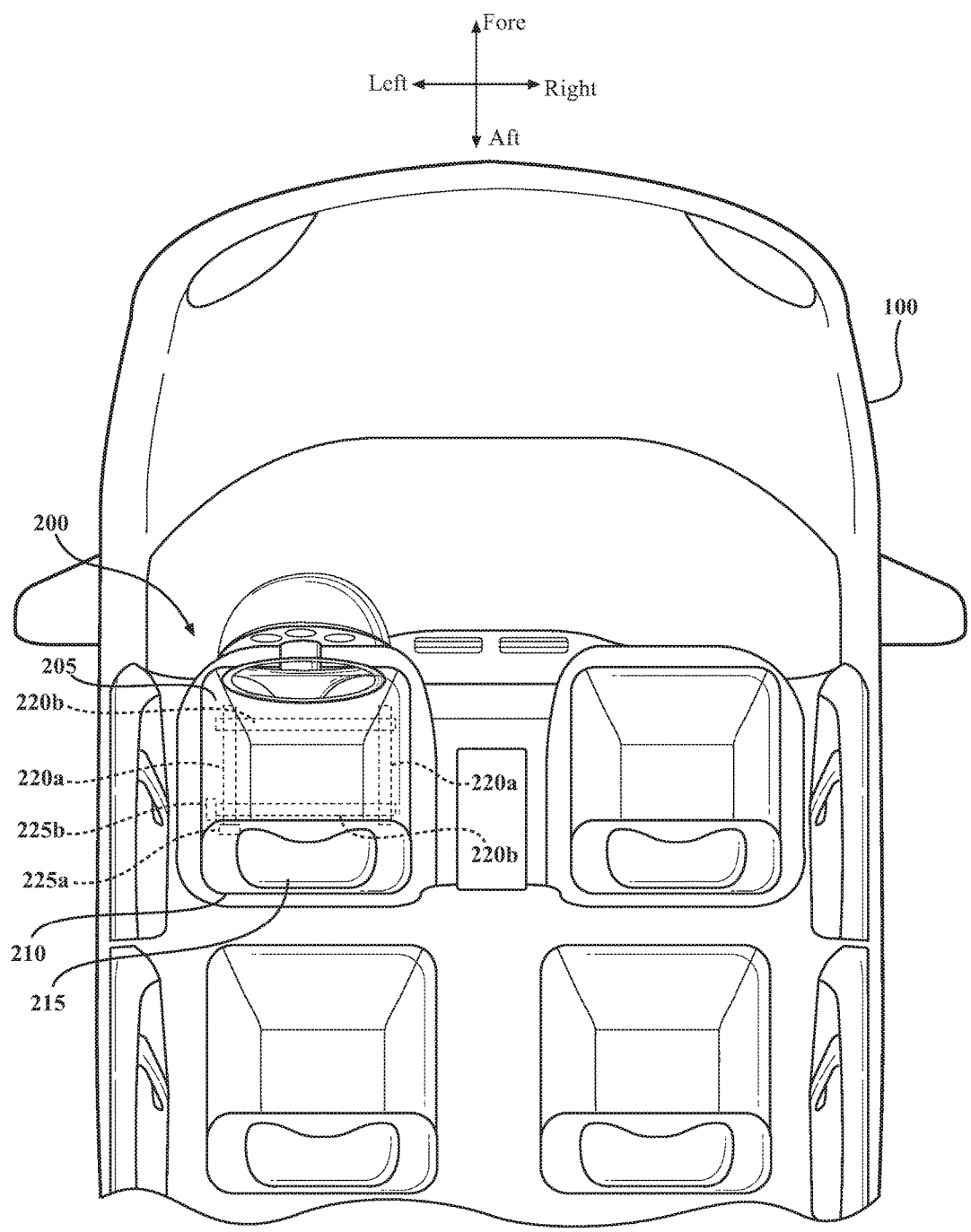
FIG. 2 is an interior view of the vehicle of FIG. 1.

Referring now to FIG. 1 and FIG. 2, the schematic view as well as an interior view of the vehicle 100 are shown, respectively.

The vehicle 100 can include a seat 200. As shown in FIG. 2, the vehicle 100 can include any number of seats 200. Each of the seat(s) 200 can include a base 205, a backrest 210, a headrest 215, etc. The base 205 of the seat 200 can be operative to support, for example, an occupant of the vehicle 100. The backrest 210 can be located adjacent to an end of the base 205, and can be operative support the occupant's upper body when the occupant is seated. The headrest 215 can be attached to the top of the backrest 210, and can be operative to support the occupant's head and neck when the occupant is seated.

The base 205 can be operatively connected to the vehicle 100. In one or more arrangements, the base 205 may be positioned on and/or in one or more tracks 220. For example, the vehicle 100 may include one or more tracks 220*a* extending in the fore-aft (longitudinal) direction, and/or one or more tracks 220*b* extending in the left-right (lateral) direction.

The vehicle can include seat actuator(s) 225. The seat actuator(s) 225 may be high torque motors, pneumatic actuators, etc. The seat actuator(s) 225 used in the vehicle 100 should be able to output sufficient force on the seat 200 to accelerate the seat 200. In one or more arrangements, the base 205 of the seat can be configured to move within the tracks 220 responsive to signals being received by the seat actuator(s) 225. For example, the base 205 can move in a longitudinal direction along tracks 220*a* responsive to the seat actuator 225*a* being actuated. Additionally, the base 205 can move in a lateral direction along tracks 220*b* responsive to the seat actuator 225*b* being actuated.

While the driver's seat is described, similar components can be integrated into one or more other seats of the vehicle 100. Accordingly, the present disclosure is not limited to the driver's seat, and includes any seats of the vehicle 100.

In one or more arrangements, the vehicle 100 includes a seat actuation module 158. The seat actuation module 158 includes instructions for generating one or more signals that moves the seat 200 from a first position. The first position can be a position of the seat according to preset settings for an occupant, adjusted settings for an occupant, and/or a standard position. In this regard, the first position can be any position of the seat prior to movement according to the seat actuation module 158. In one or more arrangements, the seat actuation module 158 can generate the signal(s) that cause the seat 200 to move along the tracks 220 of the vehicle 100. In some examples, the seat actuation module 158 can generate signal(s) that moves the seat 200 along the tracks 220 in a longitudinal direction and/or in a lateral direction. As a result of the movement of the seat 200, the occupant of the seat 200 may experience a sensation in their vestibular system (e.g., the sensory system in the human body contributing to balance). The vestibular sensation experienced by the occupant may cause the occupant to pay attention to the roadway.

The seat actuation module 158 can generate the signal(s) for moving the seat 200 according to the direction and/or magnitude of acceleration for the one or more maneuver(s). In one or more arrangements, the seat actuation module 158 can generate the signal(s) for moving the seat 200 in the same (or substantially the same) direction as the direction of acceleration for the one or more maneuvers. For example, when the maneuver is a braking maneuver, the seat actuation module 158 can generate the signal(s) that moves the seat 200 from the first position in an aft direction. As another example, when the maneuver is a lateral maneuver, the seat actuation module 158 can move the seat 200 from the first position in a lateral direction.

In one or more arrangements, the seat actuation module 158 can generate the signal(s) for moving the seat 200 at an acceleration rate. For example, the seat actuation module 158 can generate the signal(s) that moves the seat 200 faster or slower. In one or more arrangements, the seat actuation module 158 can move the seat 200 faster or slower according to the magnitude of acceleration for the maneuver. In this example, the seat actuation module 158 can include instructions for moving the seat 200 according to the identified magnitude of acceleration of the vehicle 100. In one or more arrangements, the seat actuation module 158 can move the seat 200 with an acceleration rate that substantially matches the magnitude of acceleration for the maneuver. Additionally, or alternatively, the seat actuation module 158 can move the seat 200 with an acceleration rate that is scaled (e.g., 10%, 15%, 20% . . . 80%, 85%, 90%, etc.) from the magnitude of the acceleration for the maneuver. In both of the above-identified arrangements, the seat actuation module 158 can move the seat 200 with an acceleration rate corresponding to the magnitude of acceleration for the maneuver. In arrangements where the acceleration identification module 156 compares the magnitude of acceleration for a maneuver to the acceleration threshold, the seat actuation module 158 may only move the seat 200 responsive to the magnitude of acceleration being greater than the acceleration threshold. Based on this movement of the seat 200, the occupant of the seat 200 experiences the vestibular sensation for the upcoming maneuver prior to the vehicle 100 executing the maneuver.

In one or more arrangements, the vehicle 100 can include one or more internal sensors 127. The internal sensor(s) 127 can be configured or positioned to monitor one or more conditions within the interior of the vehicle. For example, the one or more internal sensors 127 can include camera(s) 128. The camera(s) 128 can be configured to capture images of the cabin of the vehicle 100. In one or more arrangements, the camera(s) 128 can be configured to monitor and/or track one or more occupants of the vehicle 100.

In one or more arrangements, the vehicle 100 can include a state tracking module 160. The state tracking module 160 can include instructions to track a state of the occupant. In some examples, the state of the occupant can include, for example, a gaze of the occupant, a concentration of the occupant, a posture of the occupant, etc. "Gaze," as used herein, can include an area of focus for an occupant within a field of view. "Concentration," as used herein, can include a degree of focus on a particular area. Therefore, the concentration of the occupant may be a function of the gaze of the occupant. "Posture," as used herein, can include the pose of the occupant within the vehicle.

The state tracking module 160 can classify the current gaze of the driver based on the data received from the internal sensor(s) 127 (e.g., the camera(s) 128). The state tracking module 160 can include instructions that cause the processor(s) 105 classify the gaze as one of directed towards the roadway, and directed away from the roadway. In one or more arrangements, the state tracking module 160 can identify, via the internal sensor(s) 127, one or more features for the occupant (e.g., face, eyes, etc.). The state tracking module 160 can include and/or access data corresponding to the location of the internal sensor(s) 127 within the vehicle 100. The state tracking module 160 can also include and/or access data corresponding to a location of, for example, the windshield 230 of the vehicle 100. The state tracking module 160 can include instructions to determine an orientation of the one or more features for the occupant with respect to the windshield 230. Responsive to the orientation of the one or more features being directed towards the windshield 230, the state tracking module 160 can classify the gaze as being directed towards the roadway. As a result, one or more modules 150 of the vehicle 10 can perform one or more functions based, at least in part, on whether the gaze of the occupant is directed towards the roadway. For example, as will be discussed in greater detail below, the seat actuation module 158 can move the seat 200 at a greater acceleration rate responsive to the occupant's gaze not being directed towards the roadway.

In one or more arrangements, the state tracking module 160 can determine, based on data from the internal sensor(s) 127, whether the occupant is concentrating on the roadway. In these arrangements, the internal sensor(s) 127 can capture data on, for example, the eyes of the occupant. The state tracking module 160 can determine whether one or more of the pupils of the occupant are dilated. The state tracking module 160 can determine the cognitive load based on whether the pupils are dilated. "Cognitive load," as used herein, can include a total amount of mental effort being used in the working memory of a person. For example, where the pupils are dilated, the occupant may have an increased cognitive load. The increased cognitive load may indicate that the occupant is concentrating on the roadway.

In one or more arrangements, the state tracking module 160 can determine, based on data from the internal sensor(s) 127, the current posture of the occupant. In these arrangements, the internal sensor(s) 127 can capture data on the hand location of the occupant, foot location, head and/or chest location in the seat, etc. Based on the data from the internal sensor(s) 127, the state tracking module 160 can determine the current posture of the occupant. The state tracking module 160 can classify the posture of the occupant as being attentive and non-attentive. For example, an attentive posture can include the occupant being positioned in an upright position, the occupant having their hands positioned near or on the steering wheel, and/or the occupant having their foot near or on the pedals.

In one or more arrangements, the state tracking module 160 determines whether the occupant is sleeping. In this example, the state tracking module 160 can determine, based on the one or more identified features for the occupant (e.g., the eyes of the occupant), whether the occupant's eyes are closed. Responsive to the occupant's eyes being closed, the state tracking module 160 can determine that the occupant is sleeping. In one or more arrangements, where the occupant is sleeping, the acceleration identification module 156 can compare the magnitude of acceleration for the maneuver to a higher acceleration threshold with respect to the acceleration threshold used when the occupant is awake.

In one or more arrangements, the seat actuation module 158 can generate a signal that moves the seat 200 corresponding to one or more state(s) of the occupant (e.g., whether the occupant is determined to be sleeping, whether the direction if the gaze is determined to be directed towards the roadway, etc.). In this regard, an occupant will experience the seat 200 movement (via the seat actuation module 158) and the resulting vestibular sensation according to their state.

In some examples, the seat actuation module 158 may only generate the signal to actuate the seat 200 when the gaze of the occupant is not directed towards the roadway or when the occupant is determined to be sleeping. In this example, the occupant will experience the seat movement when they are not looking towards the roadway and/or are asleep, and will not experience the seat movement when they are awake and looking towards the roadway. Similar examples can be applied to other states of the occupant (e.g., whether the occupant is in an attentive posture, whether the occupant is concentrating on the roadway, etc.).

In one or more arrangements, the seat actuation module 158 can generate a different signal based on the state of the occupant as determined by the state tracking module 160. For example, the seat actuation module 158 can generate a signal to actuate the seat in a direction corresponding to the direction of the acceleration, and at a magnitude corresponding to both the state of the occupant and the magnitude of the acceleration. In this example, the seat actuation module 158 can move the seat at a different acceleration rate depending on the state of the occupant. For example, the seat actuation module 158 can move the seat with a greater acceleration rate if the occupant is not gazing towards the roadway. As a result, the occupant will more likely direct their attention towards the roadway due to the greater acceleration. In arrangements where the seat actuation module 158 moves the seat at a scaled acceleration rate from the magnitude of acceleration for the maneuver, the seat actuation module 158 can select a scaling factor (e.g., a percentage) based, at least in part, on the current state of the occupant. Referring back to the previous example, the seat actuation module 158 can select a higher scaling factor when the occupant is not gazing towards the roadway as opposed to the scaling factor selected when the occupant is gazing towards the roadway.

In one or more arrangements, the seat actuation module 158 can generate a different signal based on whether the occupant is determined to be sleeping (as detected by the state tracking module 160). For example, the seat actuation module 158 can generate a signal to move the seat 200 in a direction corresponding to the direction of the acceleration, and with an acceleration rate corresponding to both the magnitude of the acceleration for the maneuver and whether the occupant is sleeping. In this example, the seat actuation module 158 can move the seat 200 at a different acceleration depending on whether the occupant is awake or sleeping. In some examples, the seat actuation module 158 can move the seat 200 at a greater acceleration if the occupant is sleeping. Such an arrangement can both awaken the occupant, as well as alert the occupant to the upcoming acceleration.

In one or more arrangements, where a maneuver includes a plurality of accelerations, the seat actuation module 158 can generate the signal that moves the seat 200 according to one of the plurality of accelerations. For example, the seat actuation module 158 can generate the signal that moves the seat 200 according to the first acceleration, the acceleration with the largest magnitude, etc.

Referring now to FIG. 3, an example environment in which the vehicle 100 may operate is illustrated, along with a graphical representation of the seat position over time. As shown in FIG. 3, the vehicle 100 is located in an environment 300 with two surrounding vehicles 305, 310 located therein. Although two surrounding vehicles 305, 310 are shown, the environment 300 can include any number of surrounding vehicles and/or objects.

The environment evaluation module 152 can identify and/or detect one or more objects (e.g., surrounding vehicles 305, 310) in the external environment 300 of the vehicle 100. In some arrangements, the environment evaluation module 152 can determine relative positional data for each of the one or more objects (e.g., the surrounding vehicles 305, 310) located in the external environment of the vehicle 100.

The environment evaluation module 152 can construct a local map of the external environment of the vehicle 100. The local map can include one or more objects detected in the external environment and their relative positional data (e.g., location, velocity, acceleration, etc.) with respect to the vehicle 100. In the example environment illustrated in FIG. 3, the local map can include the surrounding vehicles 305, 310 detected in the external environment and their relative positional data with respect to the vehicle 100.

The automated control module 154 can determine a deviation from a current path of travel of the vehicle 100 (e.g., a modified path of travel). The current path of travel can be a path where the vehicle 100 maintains its current heading with minimal to no acceleration. Therefore, the modified path of travel can include one or more maneuvers needed to follow the modified path of travel, any one or more of which resulting in a change in acceleration.

In the example shown in FIG. 3, the automated control module 154 determines a plurality of deviations from the current path of travel (e.g., two lane changes). As shown, beginning at time T=0 through time $T=X_1$, the automated control module 154 can determine that the vehicle 100 is to remain on the current path of travel. Beginning at time $T=X_1$ and through time $T=X_2$, the automated control module 154 can determine that the vehicle 100 will execute a right lane change to begin passing the surrounding vehicle 310. Additionally, from time $T=X_2$ through $T=X_n$, the automated control module 154 can determine that the vehicle 100 will execute a left lane change upon passing the surrounding vehicle 310 to return to the original lane. Finally, the automated control module 154 can determine that the vehicle 100 will continue on the current path after the vehicle 100 passes the surrounding vehicle 310. Each of the maneuvers (e.g., right and left lane changes) can result in an acceleration on the vehicle 100. For example, during the right lane change, an occupant of the vehicle 100 will experience an initial acceleration in the right direction. Additionally, during the left lane change, the occupant of the vehicle 100 will experience an initial acceleration in the left direction.

The acceleration identification module 156 can identify acceleration(s) for the maneuvers (e.g., the right and left lane changes) that the vehicle 100 will execute. In one or more arrangements, the acceleration identification module 156 can access the maneuver acceleration profile(s) 114 stored on memory to identify the acceleration(s) corresponding to the one or more maneuvers. In some arrangements, the acceleration identification module 156 can compare the magnitude of acceleration for each of the maneuver(s) to the acceleration threshold. In the example shown in FIG. 3, the initial acceleration for the right (and/or left) lane change may be greater than the acceleration threshold, whereas the acceleration at the end of the right (and/or left) lane change may be less than the acceleration threshold.

The chart 315 depicted in FIG. 3 shows a lateral position of the seat 200 with respect to center over time. "Center" as used herein may be the first position. As such, the center can include any position set by the occupant and/or any nominal, standard position prior to the seat 200 (of FIG. 2) being moved according to the instructions from the seat actuation module 158. A similar chart could be shown for longitudinal position of the seat 200 with respect to center over time. The chart 315 includes times 0, $X_1$, $X_2$, $X_n$, which correspond to the future path of the vehicle 100 over time in the environment 300.

The seat actuation module 158 can generate one or more signals that moves the seat 200 according to the direction and magnitude of acceleration for the upcoming maneuvers. In one or more arrangements, the seat actuation module 158 can generate the one or more signals that moves the seat 200 prior to the automated control module 154 controlling the vehicle 100 to execute the maneuvers. Therefore, in the example shown in FIG. 3, the seat actuation module 158 can move the seat 200 in a direction and at an acceleration rate according to the magnitude and direction of acceleration for the right lane change (between $X_1$ and $X_2$) between time T=0 and $X_1$. As shown in the chart 315, the seat 200 can be moved to the right at a large acceleration rate, since the vehicle 100 is accelerating at a large magnitude during the right lane change. Additionally, the seat 200 can gradually move back to the center by the time the vehicle 100 reaches time T=$X_1$ (or any time prior to the vehicle 100 reaching time T=$X_1$).

At time=$X_1$, the vehicle 100 (via the automated control module 154) can execute the right lane change. Additionally, at that time (or sometime after time=$X_1$), the seat actuation module 158 can generate one or more other signals that moves the seat 200 in a direction and at an acceleration rate according to the magnitude and direction of acceleration for the left lane change (between $X_2$ and $X_n$). As shown, the left lane change is a more gradual lane change and, therefore, the magnitude of acceleration for the left lane change may be less than the right lane change. The seat 200 can be moved to the left at a relatively small acceleration rate, since the vehicle 100 is gradually changing between lanes. Additionally, the seat 200 can gradually move back to the center by the time the vehicle 100 reaches time=$X_2$.

At time=$X_2$, the vehicle 100 (via the automated control module 154) can execute the left lane change. Additionally, the seat 200 can maintain its position, since there are no upcoming maneuvers that result in an acceleration that is greater than the acceleration threshold.

Figure 4:
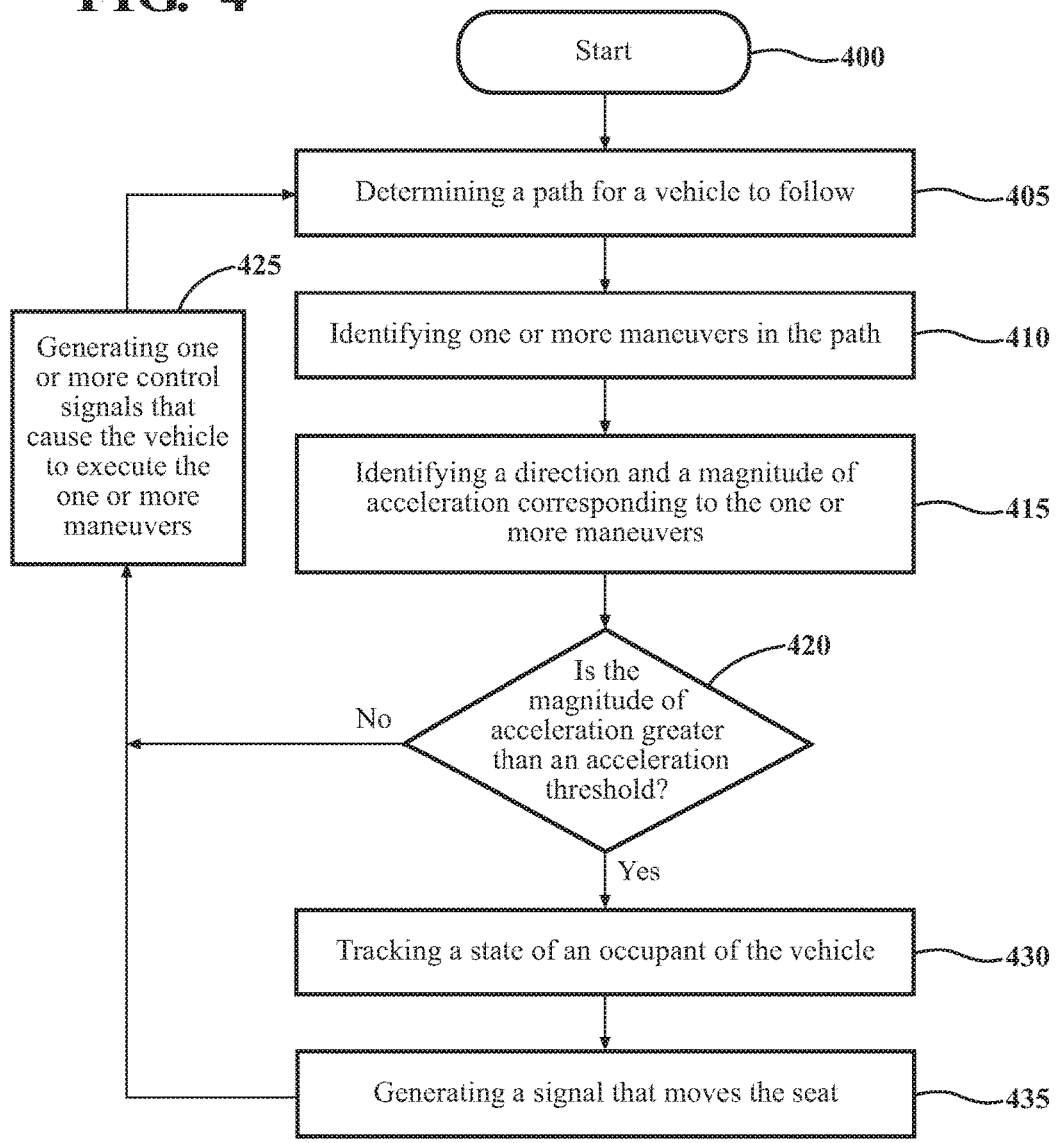
FIG. 4 illustrates an example method of providing a notification to an occupant using a vehicle seat.

Now that various aspects of the vehicle 100 have been described, a method of providing a notification of an upcoming acceleration to an occupant of the vehicle 100 will be discussed with reference to FIG. 4. The flowchart shown in FIG. 4 is for exemplary purposes. The following disclosure should not be limited to each and every function block shown in FIG. 4. To the contrary, the method does not require each and every function block shown. In some examples, the method can include additional function blocks. Further, the method does not need to be performed in the same chronological order shown in FIG. 4. To the extent possible, reference will be made to the structure described above.

The method can start at starting block 400. In one or more arrangements, the method can begin when the vehicle 100 is turned on, when the vehicle 100 is operated in an autonomous or semi-autonomous mode, etc. The method can continue to function block 405.

At function block 405, the automated control module 154 can include instructions to identify a path for the vehicle 100 to follow. In one or more arrangements, the path can be based on the environment as identified by the environment evaluation module 152. The path can include maintaining the current heading of the vehicle 100 with minimal to no accelerations, and one or more maneuvers resulting in an acceleration of the vehicle 100. The acceleration can be a result of the velocity of the vehicle 100 changing, the vehicle 100 changing course, road topology, number of lanes, speed limit, etc. The method can continue to function block 410.

At function block 410, the automated control module 154 can identify one or more maneuvers in the path. The maneuvers may include, for example, the vehicle 100 braking, speeding up, turning left or right, left or right lane changes, sway left or right, etc. Each of the maneuvers may include at least one corresponding acceleration. The acceleration(s) can include a direction of acceleration and a magnitude of acceleration. The method can continue to function block 415.

At function block 415, the acceleration identification module 156 can identify the direction and magnitude of acceleration for the one or more maneuvers in the path. The acceleration identification module 156 can access the maneuver acceleration profile 114 stored on memory 110 to identify the direction of acceleration for the one or more maneuvers in the path. Additionally, the acceleration identification module 156 can identify, based on the path determined via the automated control module 154, a magnitude of acceleration for the one or more maneuvers. The method can continue to decision block 420.

At decision block 420, the acceleration identification module 156 can compare the magnitude of acceleration for the one or more maneuvers to the acceleration threshold. If the magnitude of acceleration is less than (or equal to) the acceleration threshold, the method can continue to function block 425.

At function block 425, the automated control module 154 can generate one or more control signals that cause the vehicle 100 to execute the one or more maneuvers, which will be discussed in greater detail below. From function block 425, the method can continue back to function block 405.

However, referring back to decision block 420, where the magnitude of acceleration is greater than (or equal to) the acceleration threshold, the method can continue to function block 430.

At function block 430, the state tracking module 160 tracks a gaze of an occupant of the vehicle 100. The state tracking module 160 can track the state (e.g., the gaze, concentration, posture, etc.) of the occupant using the one or more internal sensor(s) 127. In some arrangements, the state tracking module 160 may only track the state of the occupant responsive to the magnitude of acceleration being greater than the acceleration threshold. The state tracking module 160 can identify one or more features (e.g., eyes, face, etc.) of the occupant. The method can continue to decision block 435.

At function block 435, the seat actuation module 158 can generate a signal that moves the seat 200 from a first position. The seat actuation module 158 can move the seat according to one or more properties of the acceleration (e.g., magnitude and/or direction) for the maneuver and/or one or more state(s) of the occupant. In one or more arrangements, the seat actuation module 158 can generate the signal that moves the seat 200 in a direction and at an acceleration rate corresponding to the direction and magnitude of acceleration identified at function block 415. In one or more arrangements, the seat actuation module 158 can generate the signal to move the seat 200 at an acceleration rate that is a scaled factor from the vehicle 100 acceleration magnitude for the maneuver. From function block 435, the method can continue to function block 425.

In some arrangements, at function block 430, the state tracking module 160 can determine whether the occupant is sleeping. In one or more arrangements, the state tracking module 160 can determine whether the occupant's eyes are closed. Based on the occupant's eyes being closed, the state tracking module 160 can determine that the occupant is sleeping. If the occupant is determined to be sleeping, the method can continue to function block 435. In some examples, the seat actuation module 158 can generate the signal that moves the seat 200 at a first acceleration rate when the occupant is determined to be sleeping. However, where the occupant determined to be awake, the method can continue to function block 425.

In some arrangements, at function block 430, the state tracking module 160 can determine whether the gaze of the occupant is directed towards the roadway. In one or more arrangements, the state tracking module 160 can compare an orientation of the one or more features to a location of the windshield 230. Based on this comparison, the state tracking module 160 can determine the direction of the occupant's gaze with respect to the roadway. If the gaze of the occupant is directed towards the roadway, the method can continue to function block 425. However, if the gaze of the occupant is not directed towards the roadway, the method can continue to function block 435.

In some arrangements, at function block 430, the state tracking module 160 can determine whether the occupant is concentrating on the roadway. In one or more arrangements, the state tracking module 160 can identify, based on data from the internal sensor(s) 127, the eyes of the occupant. The state tracking module 160 can determine whether the pupils of the occupant are dilated. The state tracking module 160 can determine the cognitive load of the occupant based on pupil dilation. Based on the predicted cognitive load, the state tracking module 160 can determine whether the occupant is concentrating on the roadway. Where the occupant is determined to not be concentrating on the roadway, the method can continue to function block 435. However, where the occupant is determined to be concentrating on the roadway, the method can continue to function block 425.

In some arrangements, at function 430, the state tracking module 160 can determine a posture of the occupant. The state tracking module 160 can classify, based on data from the internal sensor(s) 127, the posture of the occupant as being attentive and non-attentive. The state tracking module 160 can identify the location of the hands, feet, chest, head, etc. of the occupant. Where the occupant is determined to have a non-attentive posture, the method can continue to function block 435. However, where the occupant is determined to have an attentive posture, the method can continue to function block 425.

It is noted that the description of function block 430 encompasses each of the disclosed arrangements. Further, function block 430 can include a plurality of these arrangements. In this regard, the state tracking module 160 can identify one state of the occupant and more than one state of the occupant, including, but not limited to, gaze of the occupant, whether the occupant is sleeping, whether the occupant is concentrating, the posture of the occupant, etc. Further, the state tracking module 160 can identify one or more of these states in response to another state. For example, in response to identifying the occupant is not sleeping, the state tracking module 160 can identify the gaze of the occupant and/or whether the occupant is concentrating. As another example, in response to determining the occupant has a non-attentive posture, the state tracking module 160 can determine whether the occupant is sleeping.

In one or more arrangements, responsive to the occupant being awake and/or the gaze of the occupant directed towards the roadway and/or the occupant concentrating on the roadway, the seat actuation module 158 generate a signal that moves the seat 200 from the first position. In one or more arrangements, the seat actuation module 158 can generate the signal that moves the seat 200 in a direction and at an acceleration rate corresponding to the direction and magnitude of acceleration identified at function block 415. In one or more arrangements, the seat actuation module 158 can generate the signal to move the seat 200 at an acceleration rate that is a scaled factor from the vehicle 100 acceleration magnitude for the maneuver. In one or more arrangements, the acceleration rate described herein may be less than the acceleration rate used in response to, for example, the occupant sleeping, not concentrating, etc. for the same maneuver. From decision block 445 and following the seat actuation module 158 generating the signal, the method can continue to function block 425.

In one or more arrangements, where the seat actuation module 158 generates the signal to cause the seat to move from the first position (e.g., at function blocks 440, 450, etc.), the seat actuation module 158 can generate another signal that gradually moves the seat 200 back to the first position. In some examples, the seat actuation module 158 can generate the signal that moves the seat 200 back to the first position when the maneuver has been executed, prior to the maneuver being executed, etc.

In one or more arrangements, the method shown in FIG. 4 can continue to loop until it ends. The method can end when the vehicle 100 is no longer operated in an autonomous or semi-autonomous mode, when the vehicle 100 is turned off, etc.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more examples, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more examples, the vehicle 100 is highly automated or completely automated. In one example, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a path. In one or more arrangements, the vehicle 100 is configured one or more semi-autonomous operational modes in which one or more computing systems control one or more components of the vehicle 100 to cause the vehicle 100 to follow a modified path deviating from the current path being followed by the vehicle operator. In this example, the one or more computing systems control one or more components of the vehicle 100 to cause the vehicle 100 to follow a modified path responsive to determining a deviation from the current path being followed by the vehicle operator.

As stated above, the vehicle 100 can include processor(s) 105. In one or more arrangements, the processor(s) 105 can be a main processor of the vehicle 100. For instance, the processor(s) 105 can be an electronic control unit (ECU).

Additionally, the vehicle can include memory 110. The memory 110 store can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 110 can be a component of the processor(s) 105, or the memory 110 can be operatively connected to the processor(s) 105 for use thereby. The term "operatively connected," as used throughout this description, can include direct or indirect connections, including connections without direct physical contact.

In one or more arrangements, the memory 110 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static object maps 118. The static object map(s) 118 can include information about one or more static objects located within one or more geographic areas. A "static object" is a physical object whose position does not change or substantially change over a period of time and/or whose size does not change or substantially change over a period of time. Examples of static objects include trees, buildings, curbs, fences, railings, medians, utility poles, statues, monuments, signs, benches, furniture, mailboxes, large rocks, hills. The static objects can be objects that extend above ground level. The one or more static objects included in the static object map(s) 118 can have location data, size data, dimension data, material data, and/or other data associated with it. The static object map(s) 118 can include measurements, dimensions, distances, and/or information for one or more static objects. The static object map(s) 118 can be high quality and/or highly detailed. The static object map(s) 118 can be updated to reflect changes within a mapped area.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 105, the memory 110, and/or another element of the vehicle 100 (including any of the elements shown in FIG. 2). The sensor system 120 can acquire data of at least a portion of the external environment of the vehicle 100 (e.g., the present context).

The sensor system 120 can include any suitable type of sensor. Various examples of different types of sensors will be described herein. However, it will be understood that the examples are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS) 124, a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more external environment sensors 122 configured to acquire, and/or sense driving environment data. "Driving environment data" includes and data or information about the external environment in which an autonomous vehicle is located or one or more portions thereof. For example, the one or more external environment sensors 122 can be configured to detect, quantify and/or sense objects in at least a portion of the external environment of the vehicle 100 and/or information/data about such objects. Such objects can be stationary objects and/or dynamic objects. Further, the one or more external environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors can be part of the one or more external environment sensors 122 and/or the one or more vehicle sensors 121. However, it will be understood that the examples are not limited to the particular sensors described.

As an example, in one or more arrangements, the sensor system 120 can include one or more radar sensors 125, one or more LIDAR sensors 126, one or more sonar sensors, and/or one or more cameras 123. In one or more arrangements, the one or more cameras 123 can be high dynamic range (HDR) cameras or infrared (IR) cameras.

The vehicle 100 can include an input system 165. An "input system" includes any device, component, system, element or arrangement or groups thereof that enable information/data to be entered into a machine. The input system 165 can receive an input from a vehicle passenger (e.g. a driver or a passenger). The vehicle 100 can include an output system 170. An "output system" includes any device, component, or arrangement or groups thereof that enable information/data to be presented to a vehicle passenger or occupant (e.g. a person, a vehicle passenger, etc.).

The vehicle 100 can include one or more vehicle systems 140. Various examples of the one or more vehicle systems 140 are shown in FIG. 2. However, the vehicle 100 can include more, fewer, or different vehicle systems. It should be appreciated that although particular vehicle systems are separately defined, each or any of the systems or portions thereof can be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a path for the vehicle 100. The navigation system 147 can include a global positioning system 124, a local positioning system or a geolocation system.

The vehicle 100 can include one or more modules 150, at least some of which are described herein. The modules can be implemented as computer-readable program code that, when executed by a processor 105, implement one or more of the various processes described herein. One or more of the modules 150 can be a component of the processor(s) 105, or one or more of the modules 150 can be executed on and/or distributed among other processing systems to which the processor(s) 105 is operatively connected. The modules 150 can include instructions (e.g., program logic) executable by one or more processor(s) 105. Alternatively, or in addition, the memory 110 can contain such instructions.

In one or more arrangements, one or more of the modules 150 described herein can include artificial or computational intelligence elements, e.g., neural network, fuzzy logic or other machine learning algorithms. Further, in one or more arrangements, one or more of the modules 150 can be distributed among a plurality of the modules described herein. In one or more arrangements, two or more of the modules 150 described herein can be combined into a single module.

The vehicle 100 can include an automated control module(s) 154. The automated control module(s) 154 can be configured to communicate with the various vehicle systems 140. In one or more arrangements, the processor(s) 105 and/or automated control module(s) 154 can be operatively connected to communicate with the various vehicle systems 140 and/or individual components thereof. For example, returning to FIG. 2, the processor(s) 105 and/or the automated control module(s) 154 can be in communication to send and/or receive information from the various vehicle systems 140 to control the movement, speed, maneuvering, heading, direction, etc. of the vehicle 100. The processor(s) 105 and/or the automated control module(s) 154 can control some or all of these vehicle systems 140 and, thus, the vehicle 100 can be partially or fully autonomous.

The vehicle 100 can include one or more automated control module(s) 154. The automated control module(s) 154 can be configured to receive data from the sensor system 120 and/or any other type of system capable of capturing information relating to the vehicle 100 and/or the external environment of the vehicle 100. In one or more arrangements, the automated control module(s) 154 can use such data to generate one or more driving scene models. The automated control module(s) 154 can determine position and velocity of the vehicle 100. The automated control module(s) 154 can determine the location of objects, objects, or other environmental features including traffic signs, trees, shrubs, neighboring vehicles, pedestrians, etc. The automated control module(s) 154 can be configured to receive, and/or determine location information for objects (e.g., the vehicle 100) within the external environment of the vehicle 100 for use by the processor(s) 105, and/or one or more of the modules 150 described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated control module(s) 154 can be configured to determine path(s), current autonomous driving maneuvers for the vehicle 100, future autonomous driving maneuvers and/or modifications to current autonomous driving maneuvers based on data acquired by the sensor system 120, driving scene models, and/or data from any other suitable source. In one or more arrangements, the automated control module(s) 154 can be configured to determine path(s) for the vehicle 100 so as to avoid particular areas of the vehicle 100 in the event of a likely collision with the vehicle 100.

The processor(s) 105 and/or the automated control module(s) 154 can be operable to control the navigation and/or maneuvering of the vehicle 100 by controlling one or more of the vehicle systems 140 and/or components thereof. For instance, when operating in an autonomous or semi-autonomous mode, the processor(s) 105 and/or the automated control module(s) 154 can control the direction and/or speed of the vehicle 100. The processor(s) 105 and/or the automated control module(s) 154 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action can occur, either in a direct or indirect manner.

The vehicle 100 can include one or more actuators 148. The actuators 148 can be any element or combination of elements operable to modify, adjust and/or alter one or more of the vehicle systems 140 or components thereof responsive to receiving signals or other inputs from the processor(s) 105 and/or the automated control module(s) 154. Any suitable actuator can be used. For instance, the one or more actuators

148 can include motors, pneumatic actuators, hydraulic pistons, relays, solenoids, and/or piezoelectric actuators, just to name a few possibilities.

The automated control module(s) 154 can be configured to determine one or more driving maneuvers to follow the determined path(s) for the vehicle 100. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated control module(s) 154 can be configured can be configured to implement the determined driving maneuvers. The automated control module(s) 154 can cause, directly or indirectly, such autonomous driving maneuvers to be implemented. As used herein, "cause" or "causing" means to make, command, instruct, and/or enable an event or action to occur or at least be in a state where such event or action can occur, either in a direct or indirect manner. The automated control module(s) 154 can be configured to execute various vehicle functions and/or to transmit data to, receive data from, interact with, and/or control the vehicle 100 or one or more systems thereof (e.g. one or more of vehicle systems 140).

The arrangements disclosed herein have many benefits over other systems. For example, the arrangements disclosed herein can direct the attention of an occupant back to the roadway. The arrangements disclosed herein can impart a vestibular sensation on an occupant of the vehicle, rather than a sense of touch. The arrangements disclosed herein can prepare occupants for upcoming accelerations. The arrangements disclosed herein can change a degree of the notification based on the occupant's present state (e.g., sleeping, paying attention to the road, etc.). The arrangements disclosed herein can awaken sleeping occupants.

Detailed examples are disclosed herein. However, it is to be understood that the disclosed examples are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various examples are shown in FIGS. 1-4, but the examples are not limited to the illustrated structure or application.

The flowcharts and block diagrams in the figures illustrate the architecture, functionality, and operation of possible implementations of systems, methods and computer program products according to various examples. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the maintenance conditions enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for providing a notification of an upcoming acceleration to an occupant of a vehicle on a roadway, the system comprising:
   a camera, configured to monitor the occupant;
   a seat;
   one or more seat actuators, the one or more seat actuators being operatively connected to the seat;
   a processor operatively connected to the one or more seat actuators; and
   a memory operatively connected to the processor, the memory storing:
      an acceleration identification module including instructions that, when executed by the processor, cause the processor to
         identify a direction and magnitude of vehicle acceleration corresponding to a maneuver associated with the vehicle;
      a state tracking module including instructions that, when executed by the processor, cause the processor to
         track a state of the occupant based on data received from the camera; and
         determine, based on the received data, whether a gaze of the occupant is directed towards the roadway; and
      a seat actuation module including instructions that, when executed by the processor, cause the processor to
         determine a seat acceleration rate, relative to the vehicle, in a direction corresponding to the direction of the vehicle acceleration, the seat acceleration rate based on the magnitude of the vehicle acceleration for the maneuver and the state of the occupant, wherein the seat acceleration rate includes a first seat acceleration rate when the gaze of the occupant is not directed towards the roadway and a second seat acceleration rate when the gaze of the occupant is directed towards the roadway, the first seat acceleration rate being different than the second seat acceleration rate; and
         generate a signal to activate the one or more seat actuators to move the seat at the determined seat acceleration rate.

2. The system of claim 1, wherein the state tracking module includes instructions that cause the processor to determine whether the occupant is sleeping based, at least in part, on the state of the occupant.

3. The system of claim 2, wherein the seat actuation module includes instructions that cause the processor to generate the signal that moves the seat responsive to the occupant sleeping.

4. A method of providing a notification of an upcoming acceleration to an occupant of a vehicle on a roadway, the method comprising:
   monitoring the occupant with a camera;
   receiving data based on the monitoring of the occupant;
   tracking a gaze of the occupant based on the received data;
   identifying a direction and magnitude of vehicle acceleration corresponding to a maneuver associated with the vehicle;
   determining a seat acceleration rate, relative to the vehicle, in a direction corresponding to the direction of the vehicle acceleration, and based on the magnitude of the vehicle acceleration and the gaze of the occupant, wherein the seat acceleration rate includes a first seat acceleration rate when the gaze of the occupant is not directed towards the roadway and a second seat acceleration rate when the gaze of the occupant is directed towards the roadway, the first seat acceleration rate being different from the second seat acceleration rate; and
   generating a signal, to activate one or more seat actuators to move a seat at the determined seat acceleration rate.

5. The system of claim 2, wherein the seat acceleration rate includes a third seat acceleration rate when the occupant is sleeping.

6. The system of claim 5, wherein the third seat acceleration rate is greater than the first seat acceleration rate.

7. The system of claim 1, wherein the acceleration identification module further includes instructions that cause the processor to compare the magnitude of the vehicle acceleration to an acceleration threshold, and wherein the seat actuation module includes instructions that cause the processor to generate the signal to activate the one or more seat actuators to move the seat, relative to the vehicle, when the magnitude of the vehicle acceleration is greater than the acceleration threshold.

8. The system of claim 1, further comprising:
   an automated control module including instructions that, when executed by the processor, cause the processor to generate one or more control signals that cause the vehicle to execute the maneuver.

9. A system for providing a notification of an upcoming acceleration to an occupant of a vehicle on a roadway, the system comprising:
   a camera, configured to monitor the occupant;
   a seat;
   one or more seat actuators, the one or more seat actuators being operatively connected to the seat;
   a processor operatively connected to the one or more seat actuators; and
   a memory communicably coupled to the processor, the memory storing:
      an acceleration identification module including instructions that, when executed by the processor, cause the processor to
         identify a direction and magnitude of vehicle acceleration corresponding to an upcoming maneuver associated with the vehicle;
      a state tracking module including instructions that, when executed by the processor, cause the processor to
         track a gaze of the occupant based on data received from the camera, and determine, based on the received data, whether the gaze of the occupant is directed towards the roadway; and a seat actuation module including instructions that, when executed by the processor, cause the processor to
- determine a seat acceleration rate, relative to the vehicle, in a direction corresponding to the direction of the vehicle acceleration, and based on the magnitude of the vehicle acceleration for the maneuver; and
- generate, when the gaze of the occupant is determined not to be directed towards the roadway, a signal, to activate the one or more seat actuators to move the seat, relative to the vehicle, from a first position (i) in a direction corresponding to the direction of the vehicle acceleration, and (ii) at the determined seat acceleration rate.

10. The system of claim 9, wherein the acceleration identification module further includes instructions that cause the processor to compare the magnitude of the vehicle acceleration to an acceleration threshold, and wherein the seat actuation module includes instructions that cause the processor to generate the signal to activate the one or more seat actuators to move the seat, relative to the vehicle, when the magnitude of the vehicle acceleration is greater than the acceleration threshold.

11. The system of claim 10, wherein the state tracking module further includes instructions that, when executed by the processor, cause the processor to determine whether the occupant is sleeping.

12. The system of claim 11, wherein the acceleration threshold is a first acceleration threshold, and wherein the acceleration identification module further includes instructions that cause the processor to compare the magnitude of the vehicle acceleration to a second acceleration threshold responsive to the occupant sleeping, the second acceleration threshold being greater than the first acceleration threshold.

13. The system of claim 9, further comprising:
an automated control module including instructions that, when executed by the processor, cause the processor to generate one or more control signals that cause the vehicle to execute the upcoming maneuver.

14. The method of claim 4, further comprising:
determining whether the occupant is sleeping based, at least in part, on the gaze of the occupant.

15. The method of claim 14, wherein the first seat acceleration rate includes a third seat acceleration rate when the occupant is sleeping and a fourth seat acceleration rate when the occupant is not sleeping, and
further comprising generating the signal to activate the one or more seat actuators to move the seat at the third seat acceleration rate when it is determined that the occupant is sleeping.

16. The method of claim 4, further comprising:
comparing the magnitude of the vehicle acceleration to an acceleration threshold, and wherein generating the signal to activate the one or more seat actuators to move the seat, relative to the vehicle, is performed when the magnitude of the vehicle acceleration is greater than the acceleration threshold.

17. The method of claim 15, further comprising:
generating the signal to activate the one or more seat actuators to move the seat at the fourth seat acceleration rate when it is determined that the occupant is not sleeping and the gaze of the occupant is not directed towards the roadway.

* * * * *